(12) United States Patent
Sawada (10) Patent No.: US 8,021,268 B2
(45) Date of Patent: Sep. 20, 2011

(54) VEHICULAR CONTROL APPARATUS AND CONTROL METHOD

(75) Inventor: Hiroyuki Sawada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 609 days.

(21) Appl. No.: 12/210,319

(22) Filed: Sep. 15, 2008

(65) Prior Publication Data
US 2009/0088293 A1    Apr. 2, 2009

(30) Foreign Application Priority Data

Sep. 28, 2007   (JP) ................................. 2007-255273

(51) Int. Cl.
*F16H 61/00* (2006.01)
*B60W 10/04* (2006.01)
*B60W 10/18* (2006.01)
*G06F 7/00* (2006.01)
*G06F 17/00* (2006.01)

(52) U.S. Cl. ........................... 477/118; 477/183; 701/52
(58) Field of Classification Search .................... 477/92, 477/118, 183–185; 701/51–54
See application file for complete search history.

(56) References Cited

U.S. PATENT DOCUMENTS

| 4,771,657 | A  | * | 9/1988 | Iwatsuki  | 477/93 |
| 6,353,787 | B2 | * | 3/2002 | Nishiyama | 701/93 |

FOREIGN PATENT DOCUMENTS

| JP | 8-312774  | 11/1996 |
| JP | 10-203203 | 8/1998  |
| JP | 11-13873  | 1/1999  |
| JP | 11-63211  | 3/1999  |
| JP | 2000-35114| 2/2000  |

OTHER PUBLICATIONS

Office Action issued Jul. 20, 2010, in Japanese Patent Application No. 2007-25273.

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

The invention provides a control apparatus and a control method for a vehicle provided with an automatic transmission which has an automatic shift mode in which a gear is selected according to a running state and a manual shift mode in which a gear is selected according to a manual operation, and which transmits driving force generated by an internal combustion engine. The control apparatus and control method determine whether the vehicle is in a high load state; determine whether engine braking force from the internal combustion engine is required; calculate differential braking force which is the difference between engine braking force generated when running in a gear selected according to the manual operation and engine braking force generated when running in a gear selected according to the running state; and control the automatic transmission to execute an upshift and perform control to generate the calculated differential braking force when it is determined that i) the vehicle is in the high load state and ii) the engine braking force is required, while the automatic transmission is in the manual shift mode.

20 Claims, 7 Drawing Sheets

|     | C1 | C2 | C3 | C4  | B1  | B2  | B3  | B4  | F1 | F2 | F3 | F4 |
|-----|----|----|----|-----|-----|-----|-----|-----|----|----|----|----|
| P   |    |    |    |     |     |     |     |     |    |    |    |    |
| R   |    |    | O  |     | (O) |     |     | O   | O  |    |    |    |
| N   |    |    |    |     |     |     |     |     |    |    |    |    |
| 1st | O  |    |    | (O) |     |     |     | (O) |    |    | O  | O  |
| 2nd | O  |    |    | (O) |     | (O) | O   |     | O  | O  |    | O  |
| 3th | O  |    | O  | (O) | (O) |     | △   |     | O  |    |    | O  |
| 4th | O  | O  | △  | (O) |     |     | △   |     |    |    |    | O  |
| 5th | △  | O  | O  |     | O   |     | △   |     |    |    |    |    |
| 6th | △  | O  |    |     | △   | O   | △   |     |    |    |    |    |

O: APPLIED   (O): APPLIED WHEN ENGINE BRAKE IS ON
△: APPLIED BUT NOT CARRYING LOAD

| SHIFT LEVER POSITION | INDICATOR DISPLAY | GEAR |
|---|---|---|
| D | NOT ILLUMINATED | 1, 2, 3, 4, 5, 6 |
| S | 6 | 1, 2, 3, 4, 5, 6 |
| | 5 | 1, 2, 3, 4, 5 |
| | 4 | 1, 2, 3, 4 |
| | 3 | 1, 2, 3 |
| | 2 | 1, 2 |
| | 1 | 1 |

VEHICULAR CONTROL APPARATUS AND CONTROL METHOD

INCORPORATION BY REFERENCE

The disclosure of Japanese Patent Application No. 2007-255273 filed on Sep. 28, 2007, including the specification, drawings and abstract is incorporated herein by reference in its entirety.

BACKGROUND OF THE INVENTION

1. Field of the Invention

The invention relates to a vehicular control apparatus and control method. More particularly, the invention relates to a vehicular control apparatus and control method that executes shift control of an automatic transmission.

2. Description of the Related Art

One known vehicular control apparatus performs shift control of an automatic transmission that has an automatic shift mode (hereinafter referred to as "automatic mode") in which the gear of the automatic transmission is selected automatically based on the vehicle speed and the throttle opening amount, and a manual shift mode (hereinafter referred to as "manual mode") in which a driver can manually select the range by operating a shift lever. The control apparatus performs the shift control of the automatic transmission by switching between these two modes, (i.e., the automatic mode and the manual mode) according to an operation by the driver. Having the vehicular control apparatus normally control the automatic transmission in the automatic mode makes driving easier by eliminating the need for the driver to perform shift operations. On the other hand, because in the manual mode the vehicular control apparatus controls the automatic transmission based on an operation of a shift lever by the driver, the manual mode enables the driver to dictate the running state of the vehicle to achieve faster acceleration of the vehicle or increased braking force using the engine brake, for example.

Japanese Patent Application Publication No. 8-312774 (JP-A-8-312774) describes one such example of a vehicular control apparatus that reduces the load on an internal combustion engine when it has been continually high for a predetermined period of time or longer (i.e., that brings the engine out of a high load state when the engine has continued to be in the high load state for a predetermined period of time or longer) in the manual mode by forcing the automatic transmission to upshift.

The related vehicular control apparatus described in JP-A-8-312774 includes a manual mode detecting unit that detects when a gear of the automatic transmission is specified in the manual mode, a high load state detecting unit that detects whether the engine is in a high load state, a timer unit that measures the time during which the engine is in the high load state, and a forced upshift executing unit that forces the automatic transmission to upshift into a higher gear.

With this kind of a related vehicular control apparatus, when the manual mode detecting unit detects that the automatic transmission is in the manual mode, the high load state detecting unit detects that the engine is in a high load state, and engine has been in the high load state for a predetermined period of time or longer as measured by the timer unit, the forced upshift executing unit forces the automatic transmission to upshift into a higher gear. This prevents the various elements in the automatic transmission and the engine from overheating, thus improving durability, when the driver has been running the vehicle in a low gear in the manual mode for an extended period of time.

However, with the related vehicular control apparatus, an upshift is forcibly performed when the engine continues to be operated in a high load state for a predetermined period of time or longer while the vehicle is running in the manual mode. As a result, when the driver wishes to decelerate using the engine brake and thus releases the accelerator, the braking force from the engine brake is reduced, forcing the driver to operate the brakes unexpectedly, which reduces the stability of the vehicle while running.

SUMMARY OF THE INVENTION

This invention thus provides a vehicular control apparatus and control method which protects the engine and automatic transmission and enables the stability of the vehicle while running to be improved when the engine and the automatic transmission are in high load states.

A first aspect of the invention relates to a control apparatus for a vehicle provided with an automatic transmission which has an automatic shift mode in which a gear is selected according to a running state and a manual shift mode in which a gear is selected according to a manual operation, and which transmits driving force generated by an internal combustion engine. This control apparatus includes a high load state determining unit that determines whether the vehicle is in a high load state; a braking force required determining unit that determines whether engine braking force from the internal combustion engine is required; differential braking force calculating unit that calculates differential braking force which is the difference between engine braking force generated when running in a gear selected according to the manual operation and engine braking force generated when running in a gear selected according to the running state; a brake device that brakes the vehicle; and a controller which controls the automatic transmission to execute an upshift and controls the brake device to generate the differential braking force calculated by the differential braking force calculating unit when i) it is determined by the high load state determining unit that the vehicle is in the high load state and ii) it is determined by the braking force required determining unit that the engine braking force is required, while the automatic transmission is in the manual shift mode.

A second aspect of the invention relates to a control method for a vehicle provided with an automatic transmission which has an automatic shift mode in which a gear is selected according to a running state and a manual shift mode in which a gear is selected according to a manual operation, and which transmits driving force generated by an internal combustion engine. This control method includes determining whether the vehicle is in a high load state; determining whether engine braking force from the internal combustion engine is required; calculating differential braking force which is the difference between engine braking force generated when running in a gear selected according to the manual operation and engine braking force generated when running in a gear selected according to the running state; and controlling the automatic transmission to execute an upshift and performing control to generate the calculated differential braking force when it is determined that i) the vehicle is in the high load state and ii) the engine braking force is required, while the automatic transmission is in the manual shift mode.

According to the control apparatus and control method for a vehicle described above, when engine braking force is required while the vehicle is in the high load state and the automatic transmission is in the manual shift mode, an upshift can be performed into a higher gear and differential braking force, which is the difference between the engine braking force corresponding to a gear selected according to the running state and the engine braking force corresponding to a gear selected according to a manual operation, can be generated by the brake device. As a result, the vehicle can be brought out of the high load state by upshifting the automatic transmission into a higher gear, thereby protecting the internal combustion engine and the automatic transmission. In addition, braking force equal to the required engine braking force is generated in the vehicle. As a result, the driver will not have to perform an unexpected brake operation so stability of the vehicle during running can be improved. Also, although in this specification the term "gear" (as in "first gear, "second gear" etc.) is used, it is to be understood that it does not necessarily refer to the presence of a physical gear. That is, the term "gear" simply refers to the state of an apparatus, such as a transmission, which yields a particular relation of torque and speed between a driving portion (i.e., input) and a driven portion (i.e., output), or which permits the driven portion to rotate in either the same direction as the driving portion (i.e., the forward rotation) or the opposite direction of the driving portion (i.e., reverse rotation). Accordingly, the term "gear" in this sense is interchangeable with the term "speed" (as in "five-speed transmission"). This concept also applies to the term "gear ratio" and thus the term "gear ratio" is interchangeable with the term "speed ratio".

Also, in the control apparatus and control method for a vehicle described above, shift control of the automatic transmission may be executed according to a gear selected in the automatic shift mode and the manual shift mode, and a command to downshift in the manual shift mode may be allowed when it is determined that i) the vehicle is in the high load state and ii) engine braking force is required, while the automatic transmission is in the manual shift mode. In addition, a command to downshift in the manual shift mode may be disallowed when it is determined that the engine braking force is not required.

According to the control apparatus and control method for a vehicle described above, a command to downshift according to a manual operation may be allowed when engine braking force is required and the vehicle is in the high load state. However, a command to downshift in the manual shift mode may be disallowed when it is determined that engine braking force is not required. Accordingly, when engine braking force is required according to a command to manually downshift, control is performed to generate braking force corresponding to that specified downshift. As a result, the driver will not have to perform an unexpected brake operation. Meanwhile, the vehicle can be brought out of the high load state by automatically upshifting into a higher gear so the internal combustion engine and the automatic transmission can be protected.

Also, in the control apparatus and control method for a vehicle described above, an upshift may be executed based on a high load state shift line graph when it is determined that the vehicle is in the high load state. Also in this case, when it is determined that the vehicle is in the high load state, an upshift may be executed at the same time that that determination is made or after the vehicle has continued to be in the high load state for a predetermined period of time.

According to the control apparatus and control method for a vehicle described above, the automatic transmission can be upshifted when the vehicle is in the high load state. As a result, the vehicle can be brought out of the high load state so the internal combustion engine and the automatic transmission can be protected.

According to the invention, the vehicle can be brought out of the high load state by upshifting the automatic transmission into a higher gear, thereby protecting the internal combustion engine and the automatic transmission. In addition, braking force equal to the required engine braking force can be applied to the vehicle so the driver will not have to perform an unexpected brake operation, thus improving the stability of the vehicle during running.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Example embodiments of the present invention will be described in greater detail below with reference to the accompanying drawings.

Figure 1:
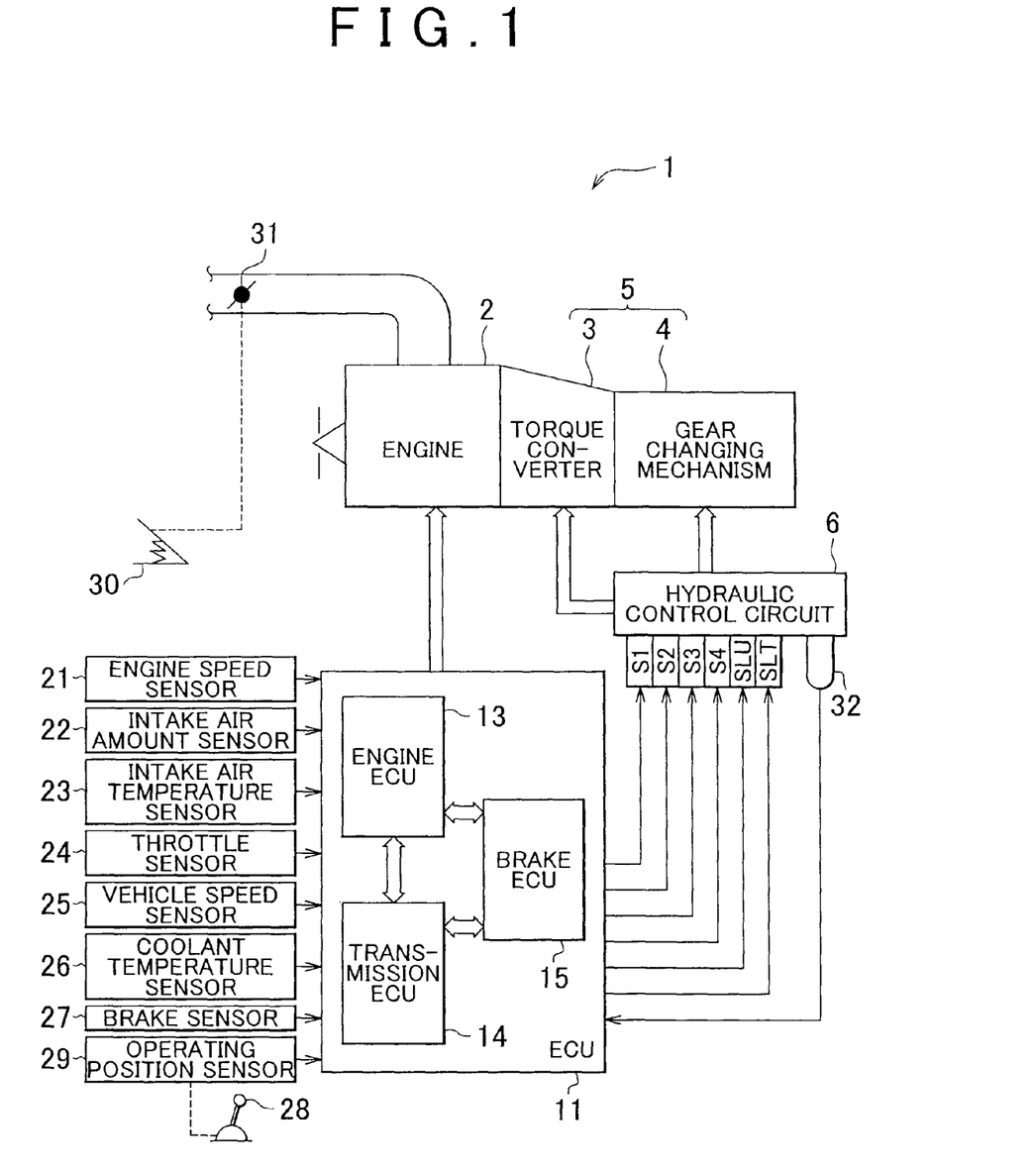
FIG. 1 is a block diagram schematically showing a vehicle provided with a control apparatus according to an example embodiment of the invention.
Figure 2:
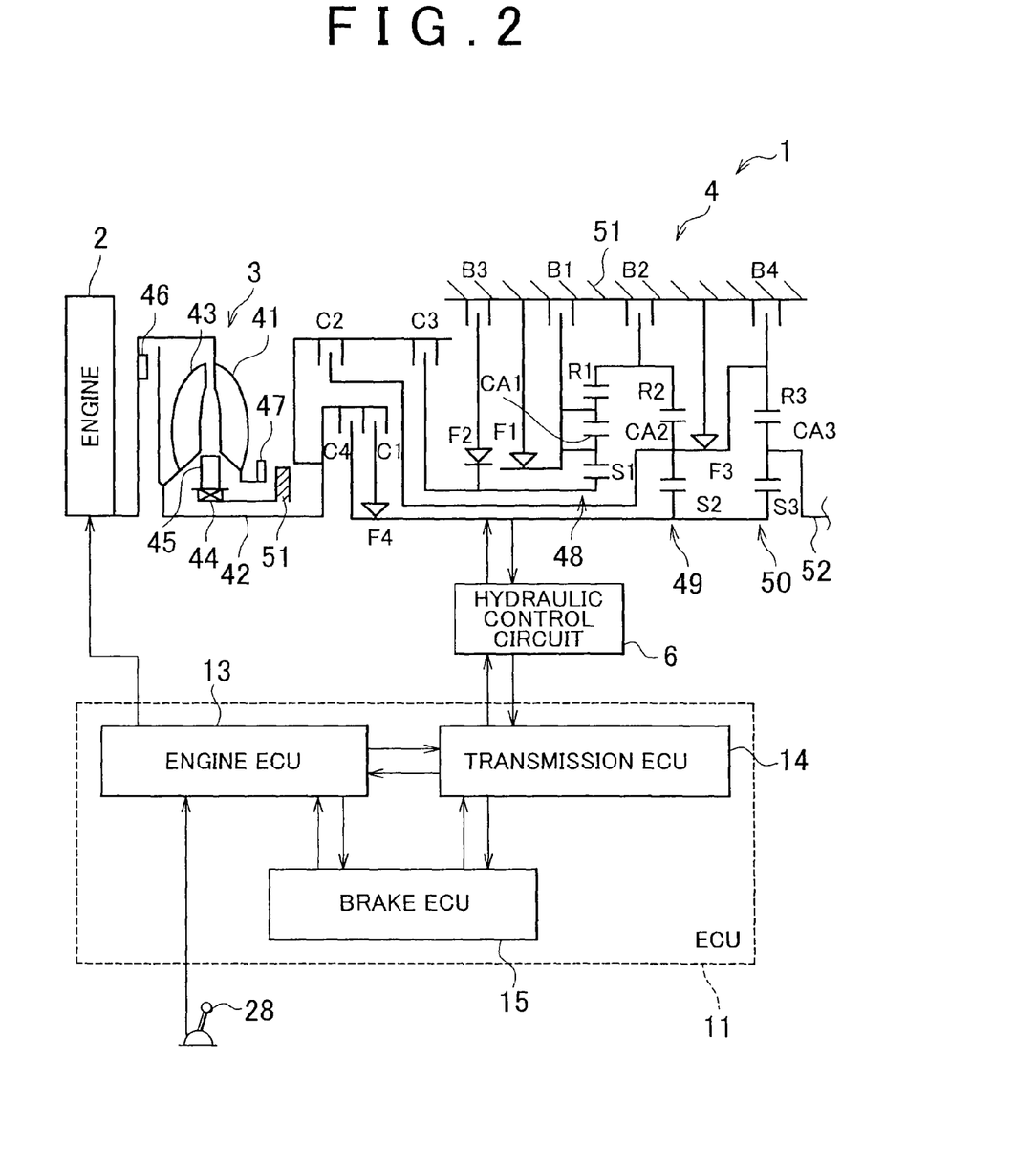
FIG. 2 is a skeleton view of the structure of the vehicular control apparatus according to the example embodiment of the invention.
Figure 3:
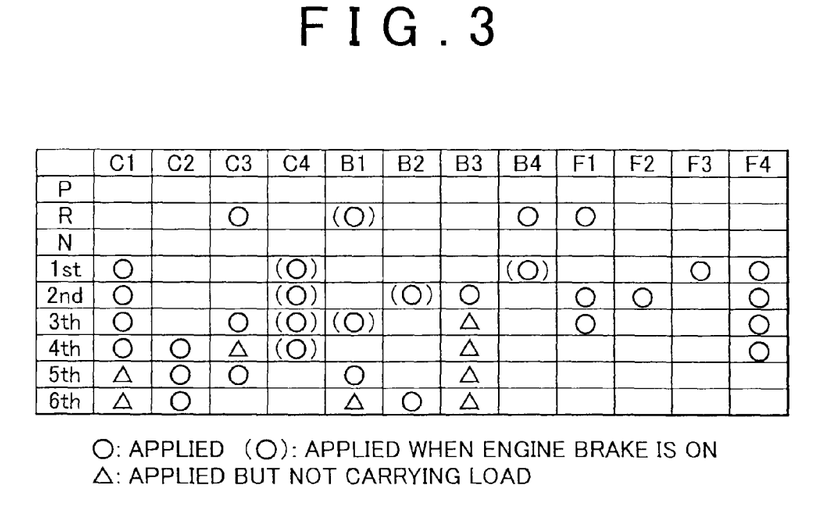
FIG. 3 is a clutch and brake application chart of an automatic transmission according to the example embodiment of the invention.

FIG. 1 is a block diagram schematically showing a vehicle provided with a control apparatus according to an example embodiment of the invention. FIG. 2 is a skeleton view of the structure of the vehicular control apparatus according to the example embodiment of the invention, and FIG. 3 is a clutch and brake application chart of an automatic transmission according to the example embodiment of the invention. Incidentally, in this example embodiment a case will be described in which the vehicular control apparatus of the invention is applied to a FR (Front engine-Rear drive) vehicle.

As shown in FIGS. 1 and 2, a vehicle 1 is provide with an engine 2 which is an internal combustion engine, a torque converter 3 that increases rotary torque output by the engine 2, and a gear change mechanism 4 that changes the speed and/or direction of rotation input from an output shaft of the torque converter 3. The rotary torque output from the gear change mechanism 4 is transmitted to driving wheels via a differential gear, not shown.

The engine 2 is a well-known power unit that outputs power by combusting a fuel such as gasoline or gas oil. Also, the torque converter 3 and the gear change mechanism 4 together form an automatic transmission 5.

As shown in FIGS. 1 and 2, the torque converter 3 is arranged between the engine 2 and the gear change mechanism 4, and includes a pump impeller 41 that is connected to the engine 2, a turbine runner 43 that is connected to an input shaft 42 of the gear change mechanism 4, and a stator 45 that is prevented from rotating in one direction by a one-way clutch 44. The pump impeller 41 and the turbine runner 43 transmit power via fluid.

Further, the torque converter 3 has a lockup clutch 46 for directly connecting (i.e., locking) the pump impeller 41 and the turbine runner 43 together. When the vehicle 1 is running at high speeds, the transfer efficiency of power from the engine 2 to the gear change mechanism 4 is improved by mechanically locking the pump impeller 41 to the turbine runner 43 using hydraulic fluid. Here, the torque converter 3 may also have flexible-lockup capability in which it allows the lockup clutch 46 to slip at a predetermined slip ratio.

Also, a mechanical oil pump 47 that generates hydraulic pressure for controlling shifts in the gear change mechanism 4, as well as hydraulic pressure for supplying lubricating oil to various parts, is provided on the pump impeller 41.

The gear shift mechanism 4 includes a double pinion type first planetary gear set 48, a single pinion type second planetary gear set 49, and a single pinion type third planetary gear set 50. A sun gear S1 of the first planetary gear set 48 is selectively connected to the input shaft 42 via a clutch C3, as well as selectively connected to a housing 51 via a one-way clutch F2 and a brake B3. Also, the sun gear S1 is prevented from rotating in the opposite direction as the input shaft 42 (hereinafter this opposite direction will be referred to as the "reverse direction") by the one-way clutch F2 and the brake B3.

A carrier CA1 of the first planetary gear set 48 is selectively connected to the housing 51 via a brake B1. Also, the carrier CA1 is normally prevented from rotating in the reverse direction by a one-way clutch F1 which is provided parallel with the brake B1.

A ring gear R1 of the first planetary gear set 48 is connected to a ring gear R2 of the second planetary gear set 49, as well as selectively connected to the housing 51 via a brake B2. A sun gear S2 of the second planetary gear set 49 is connected to a sun gear S3 of the third planetary gear set 50, as well as selectively connected to the input shaft 42 via a clutch C4. Also, the sun gear S2 is selectively connected to the input shaft 42 via a one-way clutch F4 and a clutch C1 so as to be prevented from rotating in the reverse direction.

A carrier CA2 of the second planetary gear set 49 is connected to a ring gear R3 of the third planetary gear set 50, as well as selectively connected to the input shaft 42 via a clutch C2, and selectively connected to the housing 51 via a brake B4. Also, the carrier CA2 is prevented from rotating in the reverse direction by a one-way clutch F3 that is provided parallel with the brake B4. Also, a carrier CA3 of the third planetary gear set 50 is connected to an output shaft 52.

The clutches C1 to C4 and the brakes B1 to B4 (hereinafter simply referred to as clutches C and brakes B when there in no need to specify the specific clutch or brake) are all hydraulic friction apply devices, such as multiple-disc clutches and brakes, which are controlled to apply friction using hydraulic actuators. These clutches C and brakes B are applied or released according to the hydraulic circuit that is switched by changing the operating state of a manual valve, not shown, and energizing or de-energizing transmission solenoids S1 to S4 and linear solenoids SLT and SLU in a hydraulic control circuit 6, which will be described later. Accordingly, the gear change mechanism 4 shifts into the gear that corresponds to the combination of applied and released clutches C and brakes B (see FIG. 3). The gear change mechanism 4 in this example embodiment can shift into any one of six forward gears 1st to 6th as well as one reverse gear.

The vehicle 1 also includes the hydraulic control circuit 6 for controlling the shift in the gear change mechanism 4 and the increase ratio of torque by the torque converter 3 using hydraulic pressure. The hydraulic control circuit 6 includes the transmission solenoids S1 to S4, the linear solenoids SLT and SLU, and an AT fluid temperature sensor 32 for measuring the temperature of hydraulic fluid.

The vehicle 1 also includes an engine speed sensor 21 for measuring the speed of the engine 2, an intake air amount sensor 22 for measuring the amount of air drawn into the engine 2, an intake air temperature sensor 23 for measuring the temperature of the air drawn into the engine 2, a throttle sensor 24 for measuring the opening amount of a throttle valve 31, a vehicle speed sensor 25 for measuring the vehicle speed based on the rotation speed of the output shaft 52 of the gear shift mechanism 4, a coolant temperature sensor 26 for measuring the temperature of coolant in the engine 2, and a brake sensor 27 for measuring the depression force on a brake pedal. In addition, the vehicle 1 is also provided with a shift lever 28, an operating position sensor 29 that detects the position of the shift lever 28, and an accelerator depression amount sensor 30 for measuring the accelerator depression amount.

The engine speed sensor 21 measures the speed of the engine 2 based on the rotation speed of a crankshaft, not shown.

The throttle sensor 24 is formed of a Hall element in which an output voltage corresponding to the opening amount of the throttle valve 31 is able to be obtained. The throttle sensor 24 outputs a signal indicative of the opening amount of the throttle valve 31 to an engine ECU 31 which will be described later.

The vehicle speed sensor 25 outputs a signal indicative of the vehicle speed to an engine ECU 13 and a transmission ECU 14, which will be described later, based on the rotation speed of an output shaft of the automatic transmission 5. The operating position sensor 29 detects the operating position of the shift lever 28 that is operated by a driver.

The brake sensor 27 measures the operation stroke or the change in master cylinder pressure corresponding to the force with which the driver depresses the brake pedal. The brake sensor 27 outputs an electric signal corresponding the measured depression force as a brake depression force signal to the engine ECU 13 and the brake ECU 15, which will be described later.

The accelerator depression amount sensor 30 is formed of an electronic position sensor that uses a Hall element, for example. When the driver depresses an accelerator pedal in the vehicle 1, the accelerator depression amount sensor 30 outputs a signal indicative of the accelerator depression amount that indicates the position of the accelerator pedal to the engine ECU 13 and the transmission ECU 14, which will be described later.

The vehicle 1 also has an ECU (Electronic Control Unit) 11 for electrically controlling the engine 2, the automatic transmission 5, and vehicle brakes, which will be described later. The ECU 11 controls the engine 2 and the automatic transmission 5 and the like based on, for example, data such as the vehicle speed and throttle opening amount and the like received from the various sensors, maps of shift line graphs that are stored in ROM, and programs for executing shift control that are also stored in ROM.

The ECU 11 includes the engine ECU 13 that controls the engine 2, the transmission ECU 14 that controls the automatic transmission 5, and the brake ECU 15 that controls the vehicle brakes.

The engine ECU 13 has a CPU (Central Processing Unit), RAM (Random Access Memory), ROM (Read Only Memory), and an input/output interface, none of which are shown. The engine ECU 13 outputs an engine control signal to the engine 2 so that the engine 2 is controlled according to the depression amount of the accelerator pedal.

Also, the engine ECU 13 is also connected to the engine speed sensor 21, the intake air amount sensor 22, the intake air temperature sensor 23, the throttle sensor 24, the vehicle speed sensor 25, the coolant temperature sensor 26, the brake sensor 27, the operating position sensor 29, and the AT fluid temperature sensor 32, and receives from these sensors signals indicative of the engine speed, the intake air amount, the intake air temperature, the throttle opening amount, the vehicle speed, the coolant temperature, the brake depression force, the operating position of the shift lever 28, and the AT fluid temperature, respectively.

Similarly, the engine ECU 13 also has a CPU, RAM, ROM, and an input/output interface, none of which are shown. The ROM stores maps of shift line graphs based on the vehicle speed and the throttle opening amount, and programs for executing shift control, and the like.

Also, the engine ECU 13 has an automatic shift mode in which the gear is selected according to the running state of the vehicle 1, and a manual shift mode in which the gear is selected according to a manual operation. The engine ECU 13 outputs a signal indicative of the selected gear to the transmission ECU 14. Here, the running state of the vehicle 1 refers to the speed of the vehicle 1, the throttle opening amount, the coolant temperature, and the AT fluid temperature, and the like.

Incidentally, the engine ECU 13 constitutes a vehicle control apparatus of the invention, a high load state determining unit of the invention, a braking force required determining unit of the invention, a differential braking force calculating unit of the invention, and a controller of the invention.

The transmission ECU 14 similarly includes a CPU, RAM, ROM, and an input/output interface, none of which are shown. The transmission ECU 14 receives a signal indicative of the gear to be shifted into from the engine ECU 13, as well as a signal indicative of the throttle opening amount from the throttle sensor 24, a signal indicative of the vehicle speed from the vehicle speed sensor 25, a signal indicative of the coolant temperature from the coolant temperature sensor 26, a signal indicative of the brake depression force from the brake sensor 27, a signal indicative of the operating position of the shift lever 28 from the operating position sensor 29, and a signal indicative of the hydraulic fluid temperature from the AT fluid temperature sensor 32. The transmission ECU 14 controls the hydraulic control circuit 6 to control the gear and the torque converter 3 of the automatic transmission 5 based on these signals.

Figure 4:
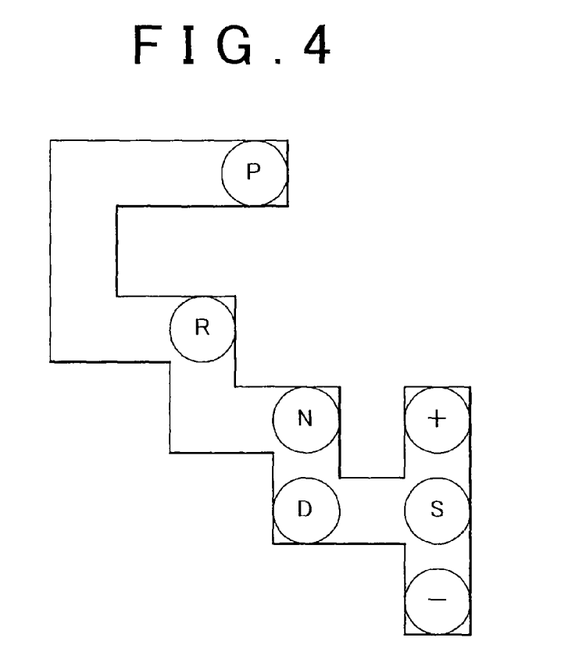
FIG. 4 is a pattern diagram showing a gate pattern to illustrate the operating positions of a shift lever.

FIG. 4 is a pattern diagram showing a gate pattern to illustrate the operating positions of the shift lever.

As shown in FIG. 4, the shift lever 28 shown in FIGS. 1 and 2 can be shifted in the longitudinal direction of the vehicle into any one of various positions according to the gate pattern. These positions include a D position that corresponds to a drive range, an N position that corresponds to a neutral range, an R position that corresponds to a reverse range, and a P position that corresponds to a park range.

Further, the shift lever 28 shown in FIGS. 1 and 2 can also be shifted into an S position that denotes a manual position for shifting gears in the automatic transmission 5 in the manual mode, a plus position (+ position) that indicates an upshift, and a minus position (− position) that indicates a downshift. That is, the shift lever 28 shown in FIGS. 1 and 2 can be used to execute sequential shifting in which the automatic transmission 5 is shifted one gear up or down from the current gear by moving the shift lever 28 into the + position or the − position, respectively.

The S position is located next to the D position. Once the shift lever 28 shown in FIGS. 1 and 2 is moved sideways from the D position into the S position, the shift lever 28 is kept in the S position by a spring, not shown.

Here, the phrase "select a gear according to a manual operation" in the invention refers to both a range being selected according to a manual operation and a specific gear being selected according to a manual operation.

A first example will now be described. During a so-called range hold in which the range selected according to a manual operation is held, the engine ECU 13 executes an upshift or a downshift when an upshift or a downshift is specified by the shift lever 28 being moved into the + position or the − position, respectively.

Figure 5:
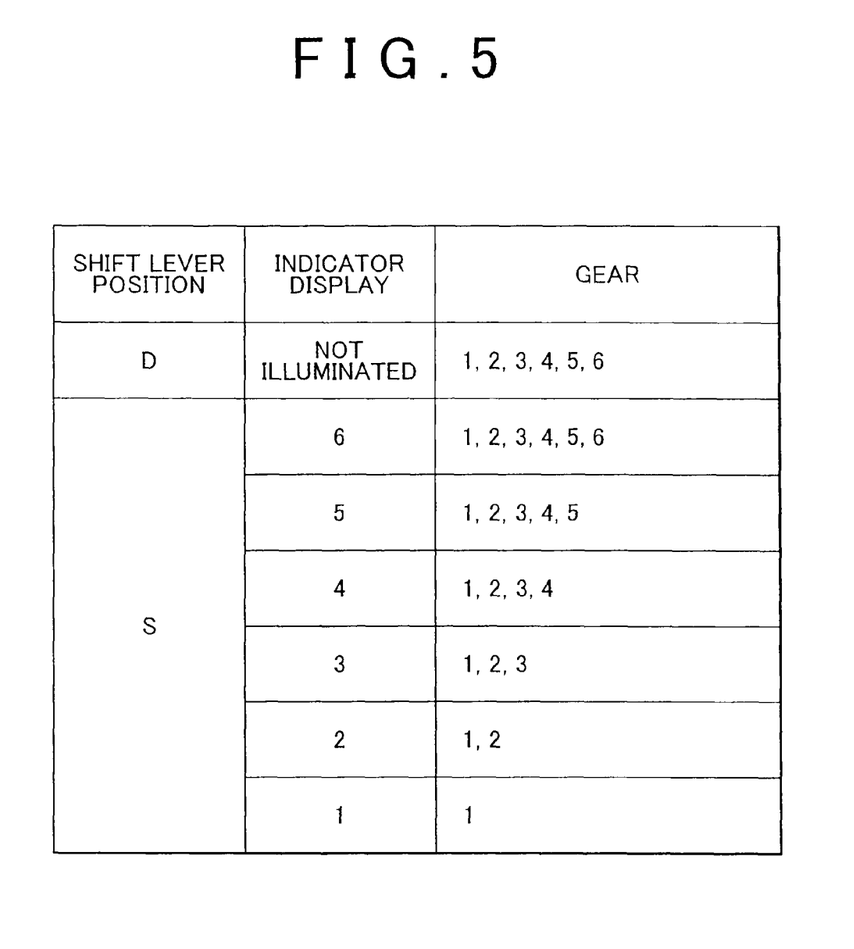
FIG. 5 is a chart showing the correlation between the specified range and the gears that can be established in the automatic transmission.

FIG. 5 is a chart showing the correlation between the specified range and the gears that can be established in the automatic transmission.

As shown in FIGS. 1, 2, and 5, the engine ECU 13 selects the optimum gear, from among a plurality of gears in which the value corresponding to the range specified by the shift lever 28 is the highest gear and first gear is the lowest gear, based on the vehicle speed, the throttle opening amount, and the shift line graph. For example, when the 6-range is selected in the manual mode, the engine ECU 13 selects a gear from first gear to sixth gear, and when the 4-range is selected, the engine ECU 13 selects a gear from first gear to fourth gear.

Also, in the manual mode, the engine ECU 13 displays the value of the range selected by the shift lever 28 on a shift range indicator in a combination meter, not shown. Here, the engine ECU 13 in this example embodiment displays the value of the range selected by the shift lever 28 on the shift range indicator under predetermined conditions, as described above, and a gear is selected based on the shift line graph.

When the engine ECU 13 receives a signal from the operating position sensor 29 indicating that the shift lever 28 is in the D position, the engine ECU 13 shifts the automatic transmission 5 into the automatic mode and shifts gears in the automatic transmission 5 via the hydraulic control circuit 6 based on a map of the vehicle speed, the throttle opening amount, and the shift line graph. Also, when the engine ECU 13 receives a signal from the operating position sensor 29 indicating that the shift lever 28 is in the S position, the engine ECU 13 shifts the automatic transmission 5 into the manual mode and shifts gears in the automatic transmission 5 according to the range selected by the driver, as shown in FIG. 5.

A second example will now be described. During a so-called gear hold, in which a specific gear selected according to a manual operation is held, when a gear shift is specified by the shift lever 28, the engine ECU 13 outputs a signal indicative of the specified gear to the transmission ECU 14 and executes control to establish that specified gear in the automatic transmission 5.

In both the first and second examples described above, the engine ECU 13 stores a plurality of shift line graphs in the ROM. These shift line graphs include, for example, a normal running shift line graph which is used during normal running, a high load state shift line graph which is used when the vehicle 1 is running in a high load state, and a shift line graph which is used during power running and running on snowy roads. The high load state shift line graph will be described later.

Figure 6:
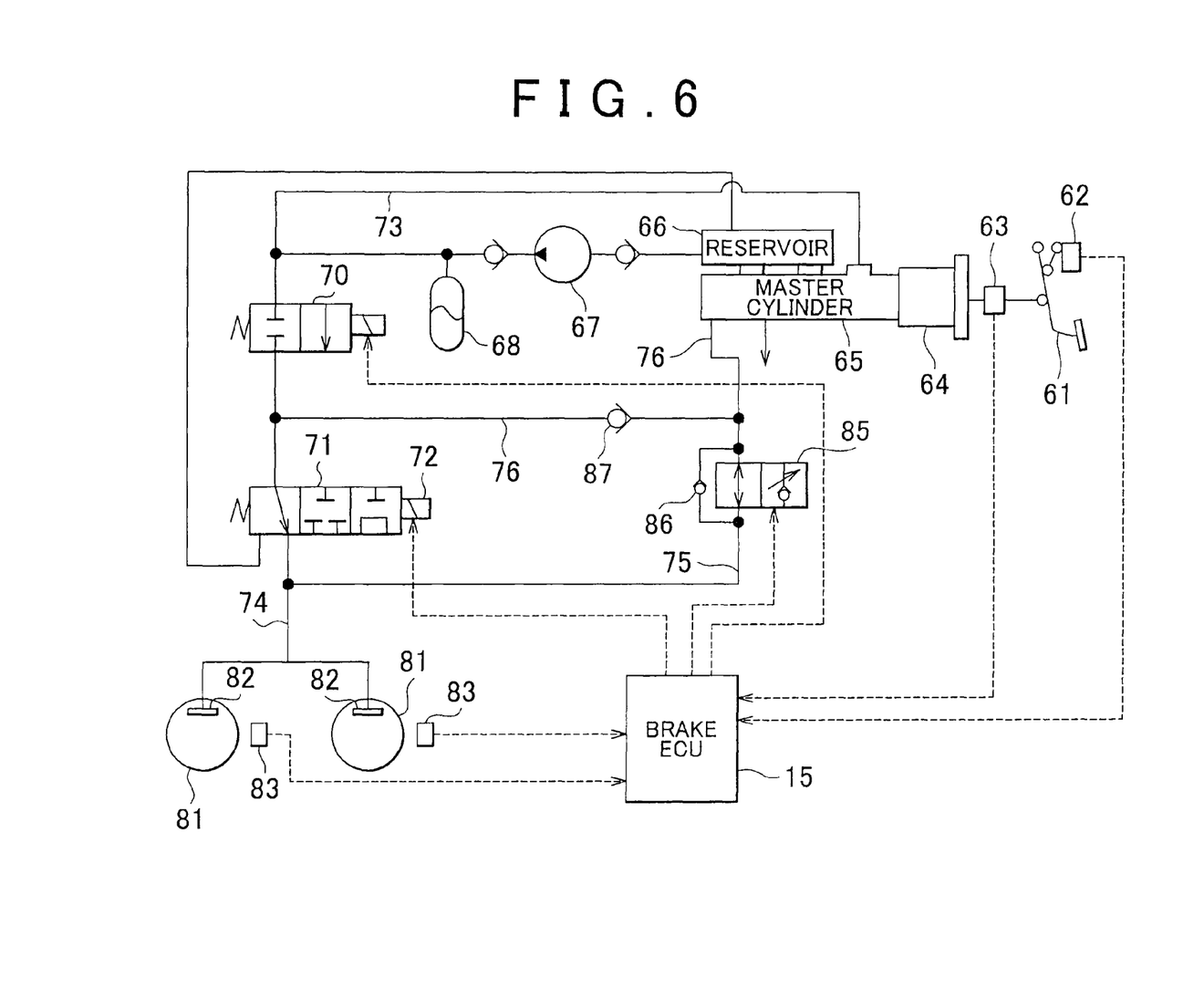
FIG. 6 is a hydraulic circuit diagram showing vehicle brakes according to the example embodiment of the invention.
Figure 7:
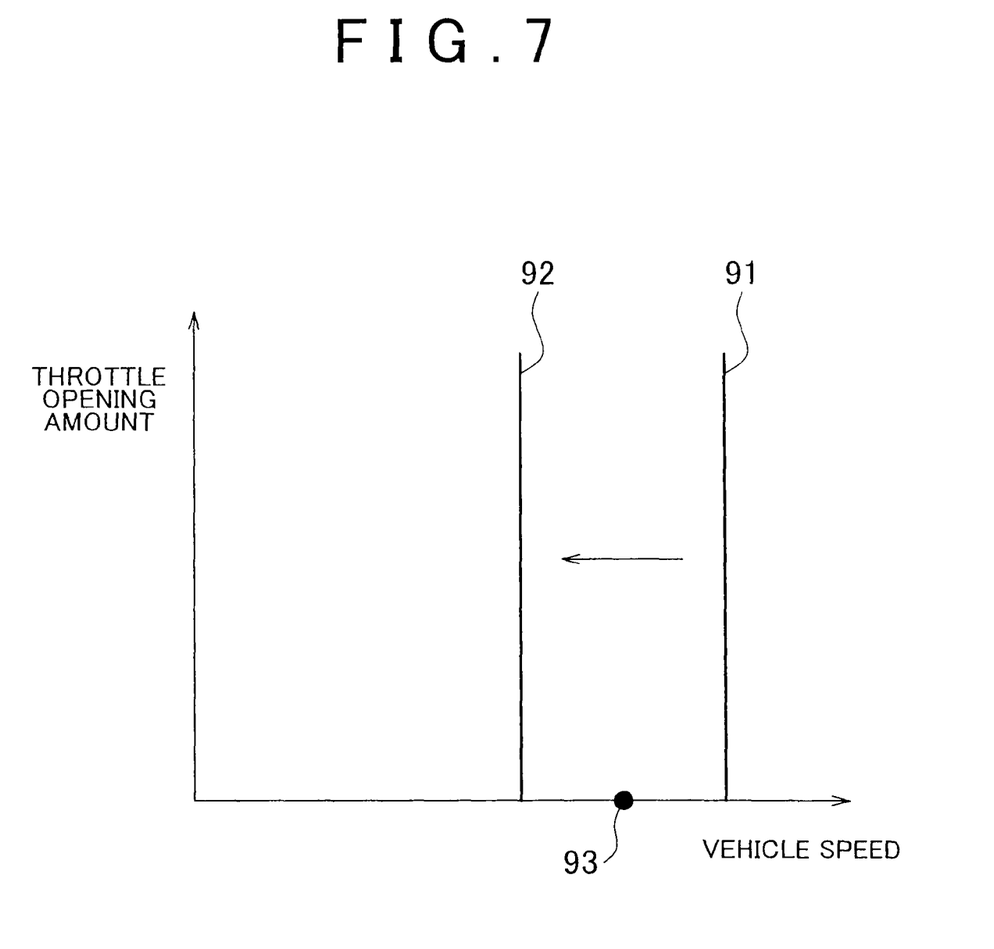
FIG. 7 is a graph for comparing the positional relationship between a shift line during normal running and a shift line when operating in a high load state.

FIG. 6 is a hydraulic circuit diagram showing structure of the vehicle brakes according to the example embodiment of the invention.

As shown in FIG. 6, a brake pedal 61 is a brake operating member that is operated by the driver of the vehicle 1. The brake pedal 61 operates a master cylinder 65 via a hydraulic booster 64. A reservoir 66 is mounted to the upper portion of the master cylinder 65. A pump 67 draws up brake fluid from inside the reservoir 66 and stores it at high pressure in an accumulator 68. The hydraulic booster 64 is connected to the accumulator 68 via a fluid path 73.

A pressurizing chamber, not shown, inside the master cylinder 65 is connected, via a main fluid passage that is formed by fluid passages 74 and 76, to a wheel cylinder 82 of a brake that brakes a rear wheel 81. The pressurizing chamber may also be connected to a wheel cylinder of a brake that brakes a front wheel. Incidentally, in this example embodiment, a case will be described in which control is performed to generate pseudo-braking force corresponding to the braking force from the engine brake and apply that pseudo-braking force to the rear wheel 81 which is a driving wheel. Similarly, in an FF vehicle, braking force is generated in the front wheels, and in a four-wheel-drive vehicle, braking force is generated in both the front and the rear wheels. Incidentally, in a four-wheel-drive vehicle, the structure of the brake system for the front wheels is the same as the structure of the brake system for the rear wheels.

A check valve 87 and an electromagnetic pressure increase/decrease valve 71 are arranged in the fluid passage 76. The electromagnetic pressure increase/decrease valve 71 is a three-position electromagnetic valve that operates in the following manner. That is, normally the electromagnetic pressure increase/decrease valve 71 is in a pressure-increase allowing state in which it allows communication between the fluid passage 74 and the fluid passage 76, i.e., the master cylinder 65 and the wheel cylinder 82. When a medium amount of current is supplied to a solenoid 72, the electromagnetic pressure increase/decrease valve 71 switches to a pressure-maintaining state in which it closes off communication between the master cylinder 65 and the wheel cylinder 82. When a large amount of current is supplied to the solenoid 72, the electromagnetic pressure increase/decrease valve 71 switches to a pressure-decrease allowing state in which it opens communication between the wheel cylinder 82 and the reservoir 66.

The vehicle brakes also include a bypass passage 75 that bypasses the electromagnetic pressure increase/decrease valve 71. Accordingly, brake fluid from the wheel cylinder 82 can be circulated to the master cylinder 65 via this bypass passage 75.

Incidentally, a linear valve 85 which keeps brake fluid in the wheel cylinder 82 when the brake is applied is provided in the bypass passage 75 between the master cylinder 65 and the wheel cylinder 82. This linear valve 85 is not limited to simply two-way ON/OFF control, but also has a function that enables it to linearly change the open/closed state of the valve. Providing this linear valve 85 enables brake pressure to be relieved gradually even if the brake pedal 61 is released all at once, for example.

Incidentally, a pressurizing valve 86 that is able to pressurize the wheel cylinder 82 while bypassing the linear valve 85 is provided in order to prevent the braking force from decreasing due to a decrease in brake pressure while it is being maintained.

The accumulator 68 is connected via an electromagnetic switching valve 70 to a portion of the fluid passage 76 downstream of the check valve 87. The electromagnetic switching valve 70 is normally in a state that closes off communication between the accumulator 68 and the fluid passage 76, but switches to an open state at the same time that the electromagnetic pressure increase/decrease valve 71 starts to operate, such that high pressure brake fluid from the accumulator 68 is supplied to the electromagnetic pressure increase/decrease valve 71. The high pressure brake fluid supplied from the accumulator 68 is prevented from flowing into the master cylinder 65 by the check valve 87.

A rotation speed sensor 83 detects the rotation speed of the rear wheel 81, a brake switch 62 detects depression of the brake pedal 61, and a load cell 63 detects the operating force of the brake pedal 61.

The brake ECU 15 includes a CPU, RAM, ROM, and an input/output interface, none of which are shown. The brake ECU 15 outputs control signals to the electromagnetic switching valve 70, the electromagnetic increase/decrease valve 71, and the linear valve 85 based on the signals from the various sensors and switches described above, as well as the signals from the engine ECU 13 and the like, and controls the hydraulic pressure in the wheel cylinders 82, i.e., the braking force applied to the wheels.

Hereinafter, the characteristic structure of the engine ECU and the brake ECU that form part of the vehicular control apparatus according to this example embodiment will be described with reference to FIGS. 1 to 7.

The engine ECU 13 that forms part of the control apparatus of the vehicle 1 determines whether the vehicle 1 is in a high load state based on the signal indicative of the coolant temperature of the engine 2 obtained from the coolant temperature sensor 26 and the signal received from the AT fluid temperature sensor 32. More specifically, the engine ECU 13 determines that the vehicle 1 is in a high load state when the AT fluid temperature or the coolant temperature of the engine 2 exceeds a predetermined threshold value stored in the ROM in advance.

Accordingly, the engine ECU 13 forms a high load state determining unit that determines whether the vehicle 1 is in a high load state.

Here, a high load state of the vehicle 1 refers to a state in which a high load is applied to the engine 2 or the automatic transmission 5. For example, when the vehicle continues to be run at a high speed in a low gear when in the manual mode, the amount of hydraulic fluid circulated in the automatic transmission 5 increases so the amount of hydraulic fluid that can be used as lubrication oil to lubricate the various elements in the automatic transmission 5 decreases. As a result, the temperature of that lubrication oil rapidly increases. If this state continues, it may result in damage to the various elements of the automatic transmission 5.

Therefore, a predetermined threshold value for the AT fluid temperature or the coolant temperature of the engine 2, which is stored in advance in the ROM, is set through testing to prevent damage to the engine 2 and the automatic transmission 5 due to the coolant temperature of the engine 2 or the AT fluid temperature becoming high.

Also, the engine ECU 13 determines that an engine brake by the engine 2 is required if the signal input from either the throttle sensor 24 or the accelerator depression amount sensor 30 is a signal indicating that the throttle opening amount or the accelerator depression amount is zero (which indicates that the throttle valve is fully closed or the accelerator is not being depressed).

Accordingly, the engine ECU 13 forms a braking force required determining unit that determines whether braking force by the engine brake is required. In this case, the expression "the braking force of the engine brake" in this example embodiment refers to engine braking force of the invention.

Incidentally, the engine ECU 13 may also determine whether the engine brake is required based on the engine speed and the turbine speed. In this case, the engine ECU 13 determines that the engine brake is required when the turbine speed exceeds the engine speed. Also, the vehicle 1 may also have a navigation system, not shown, and the engine ECU 13 may determine whether the engine brake is required based on gradient information received from the navigation system.

Also, the engine ECU 13 calculates the braking force of the engine brake that will be generated when running in a gear selected according to a manual operation. More specifically, the engine ECU 13 stores an engine braking force map, which correlates the gear and speed of the vehicle 1 with a braking force of the engine brake, in the ROM, and calculates the braking force of the engine brake that will be generated by the engine 2 from this engine braking force map that is stored in the ROM, based on the gear selected according to the manual operation and the vehicle speed obtained from the vehicle speed sensor 25.

Here, when the shift lever 28 is in the S position, the gear selected according to a manual operation refers to the gear that is currently selected. When the shift lever 28 is in the + position or the − position, the gear selected according to a manual operation refers to the gear specified by the shift lever 28 being in the + position or the − position.

Also, the engine braking force map is a map that correlates the vehicle speed and gear of the vehicle 1 with a braking force of the engine brake when the throttle opening amount is fully closed. The braking force of the engine brake is obtained by taking experimental measurements in advance.

Also, the engine ECU 13 also calculates the braking force of the engine brake generated when running in a gear selected based on the shift line graph. More specifically, the engine ECU 13 selects a gear from the shift line graph stored in the ROM based on the throttle opening amount obtained from the throttle sensor 24 and the speed of the vehicle 1 obtained from the vehicle speed sensor 25. The engine ECU 13 then calculates the braking force of the engine brake that will be generated by the engine 2 from the engine braking force map stored in the ROM based on the selected gear and the speed of the vehicle 1 obtained from the vehicle speed sensor 25.

If at this time the engine ECU 13 determines according to the method described above that the vehicle 1 is in a high load state, the engine ECU 13 selects the gear using the high load state shift line graph. In this high load state shift line graph, an upshift line 92 is at a lower speed than an upshift line 91 in the normal running shift line graph (see FIG. 7). Therefore, when the engine ECU 13 determines that the vehicle 1 is in a high load state while the throttle opening amount is fully closed and the vehicle 1 is running at a high speed (e.g., in the state indicated by point 93 in FIG. 7), the engine ECU 13 selects the gear based on the high load state shift line graph such that the automatic transmission 5 upshifts into a higher gear.

Also, the engine ECU 13 calculates the differential braking force which is the difference between i) the braking force of the engine brake generated when running in a gear selected according to a manual operation, which is calculated according to the method described above, and ii) the braking force of the engine brake generated when running in a gear selected based on the high load state shift line graph.

Accordingly, the engine ECU 13 is a differential braking force calculating unit that calculates the differential braking force between i) the braking force of the engine brake generated when running in a gear selected according to a manual operation, and ii) the braking force of the engine brake generated when running in a gear selected based on the high load state shift line graph.

Also, the engine ECU 13 controls a brake device, which will be described later, that brakes the vehicle 1, to generate the differential braking force calculated as described above.

More specifically, the engine ECU 13 outputs a signal indicative of the calculated differential braking force to the brake ECU 15, and the brake ECU 15 then brakes the vehicle 1 based on this signal indicative of the differential braking force.

Accordingly, the engine ECU 13 is a controller that controls the automatic transmission 5 via the transmission ECU 14 to execute an upshift, and controls the brake device that brakes the vehicle 1 via the brake ECU 15 to generate the calculated differential braking force when it is determined that i) the vehicle is in a high load state and ii) braking force from the engine brake is required, while the automatic transmission 5 is in the manual shift mode.

Also, the engine ECU 13 allows a command to downshift in the manual shift mode when it is determined that i) the vehicle is in the high load state and ii) braking force from the engine brake is required, while the automatic transmission 5 is in the manual shift mode.

In this case, the engine ECU 13 displays the gear specified by the allowed downshift on a shift range indicator in the combination meter, not shown. Accordingly, when the shift lever 28 is in the − position and an upshift has been performed based on the high load state shift line graph, the engine ECU 13 matches the display on the shift range indicator with the operation by the driver by displaying the specified gear of the manual downshift on the shift range indicator.

Furthermore, when the shift lever 28 is in the S position and an upshift has been performed based on the high load state shift line graph, the engine ECU 13 displays the gear before that upshift on the indicator.

Also, when it has been determined that the vehicle 1 is in the high load state while the automatic transmission 5 is in the manual shift mode and braking force from the engine brake is not required, the engine ECU 13 does not allow a command to downshift in the manual shift mode.

Moreover, the brake ECU 15 obtains the value of the differential braking force calculated by the engine ECU 13, and controls the vehicle brakes to generate the differential braking force. More specifically, once the value of the differential braking force is obtained from the engine ECU 13, the brake ECU 15 generates braking force in the rear wheel 81 by controlling the electromagnetic switching valve 70, the electromagnetic pressure increase/decrease valve 71, and the linear valve 85 to increase or decrease the hydraulic pressure applied to the wheel cylinder 82. As a result, the differential braking force is generated by the vehicle brakes. Therefore, the brake ECU 15 is a brake device that brakes the vehicle 1.

Figure 8:
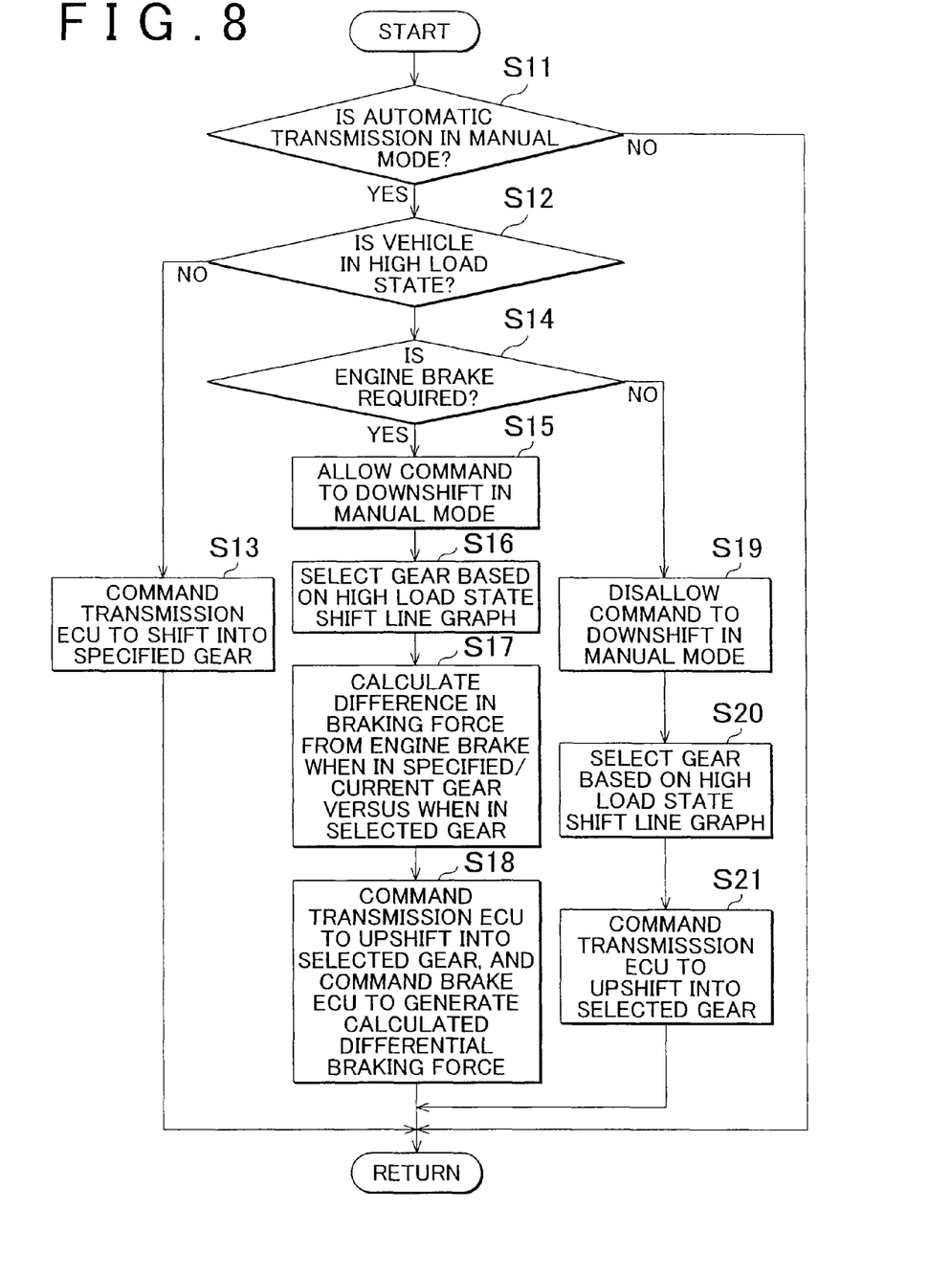
FIG. 8 is a flowchart illustrating operation of the vehicular control apparatus according to the example embodiment of the invention.

FIG. 8 is a flowchart illustrating the operation of the vehicular control apparatus according to the example embodiment of the invention. Incidentally, the following routine is executed at predetermined intervals of time by the CPU which is part of the engine ECU 13, and executes a program that can be processed by the CPU.

First, the engine ECU 13 determines whether the automatic transmission 5 is in the manual mode (step S11). More specifically, the engine ECU 13 determines that the automatic transmission 5 is in the manual mode when the shift lever 28 is in the S position, the + position or the − position, based on the signal received from the operating position sensor 29. On the other hand, the engine ECU 13 determines that the automatic transmission 5 is in the automatic mode when the shift lever 28 is in the D position.

When the engine ECU 13 determines that the automatic transmission 5 is in the manual mode (i.e., Yes instep S11), the process proceeds on to step S12. If, on the other hand, the engine ECU 13 determines that the automatic transmission 5 is not in the manual mode (i.e., No in step S11), the process returns to the start.

Next, the engine ECU 13 determines whether the vehicle 1 is in the high load state (step S1 2). More specifically, the engine ECU 13 determines whether at least either one of the coolant temperature of the engine 2 or the AT fluid temperature is exceeding a predetermined threshold temperature stored in advance in the ROM based on the signals received from the coolant temperature sensor 26 and the AT fluid temperature sensor 32. If it is determined that at least one of the coolant temperature or the AT fluid temperature is higher than the predetermined threshold value, the engine ECU 13 determines that the vehicle 1 is in a high load state (i.e., Yes in step S12) and the process proceeds on to step S14. If, on the other hand, the engine ECU 13 determines that the vehicle 1 is not in a high load state (i.e., No in step S12), the engine ECU 13 directs (i.e., commands) the transmission ECU 14 to shift into the gear specified by the manual mode (step S13).

In step S14, the engine ECU 13 determines whether the engine brake is required. More specifically, if the signal indicative of the throttle opening amount or the accelerator depression amount received by the throttle sensor 24 or the accelerator depression amount sensor 30 indicates that the throttle is fully closed or the accelerator is not being depressed, the engine ECU 13 determines that braking force from the engine brake is required (i.e., Yes in step S14) and the process proceeds on to step S15. If, on the other hand, it is determined that braking force from the engine brake is not required (i.e., No in step S 14), the process proceeds on to step S19.

Next instep S15, the engine ECU 13 allows a command to downshift in the manual mode. More specifically, if a downshift is specified in the manual mode in step S15 and thereafter, that downshift command is allowed and control is performed to display the gear specified in the manual mode on the shift range indicator in the combination meter, not shown.

Next, the engine ECU 13 selects the gear based on the high load state shift line graph (step S16). More specifically, the engine ECU 13 first obtains the speed of the vehicle 1 and the throttle opening amount based on the signal received from the vehicle speed sensor 25 and the signal received from the throttle sensor 24. Next, the engine ECU 13 selects a gear so that the automatic transmission 5 will upshift based on these values and the high load state shift line graph stored in the ROM.

Next, the engine ECU 13 calculates the differential braking force which is the difference between the braking force of the engine brake in the current gear or the specified gear in the manual mode and the braking force of the engine brake in the gear selected in step S16 (step S17). More specifically, when a downshift is specified in the manual mode, the engine ECU 13 obtains the speed of the vehicle 1 based on the signal from the vehicle speed sensor 25 and obtains the braking force of the engine brake that corresponds to the specified gear by referring to the engine braking force map stored in the ROM. Also, when the shift lever 28 is in the S position, the engine ECU 13 obtains the braking force of the engine brake corresponding to the current gear.

Next, the engine ECU 13 obtains the braking force of the engine brake corresponding to the gear selected in step S 16 from the engine braking force map. Then the engine ECU 13 calculates the differential braking force obtained from the difference between the braking force of the engine brake corresponding to the current gear or the gear specified in the manual mode, and the braking force of the engine brake corresponding to the selected gear.

Next, the engine ECU 13 directs the transmission ECU 14 to upshift the automatic transmission 5 into the gear selected in step S16, and directs the brake ECU 15 to generate the differential braking force calculated in step S17 (step S18). More specifically, the engine ECU 13 outputs a signal indicative of the gear selected in step S16 to the transmission ECU 14. Next, the transmission ECU 14 controls the hydraulic control circuit 6 to energize or de-energize the transmission solenoids S1 to S4 and the linear solenoids SLT and SLU so that the gear of the automatic transmission 5 comes to match the gear obtained from the engine ECU 13. At the same time, the engine ECU 13 outputs the value of the differential braking force to the brake ECU 15. The brake ECU 15 then adjusts the hydraulic pressure applied to the wheel cylinder 82 according to this differential braking force value so that the braking force generated in the vehicle 1 by the rear wheel 81 comes to be equal to the differential braking force.

If, on the other hand, it is determined in step S14 that the engine brake is not required, the engine ECU 13 does not allow a command to downshift in the manual mode (step S19).

Next, the engine ECU 13 selects a gear based on the high load state shift line graph (step S20). More specifically, the engine ECU 13 obtains the speed of the vehicle 1 and the throttle opening amount based on the signals received from the vehicle speed sensor 25 and the throttle sensor 24, and selects a gear based on these values and the high load state shift line graph stored in the ROM.

Then the engine ECU 13 directs (i.e., commands) the transmission ECU 14 to upshift the automatic transmission 5 into the gear selected in step S20 (step S21). More specifically, the engine ECU 13 directs the transmission ECU 14 to change the gear of the automatic transmission 5 to the gear selected in step S20. The transmission ECU 14 then shifts the automatic transmission 5 into the gear obtained from the engine ECU 13 by controlling the hydraulic control circuit 6 to energize or de-energize the transmission solenoids S1 to S4 and the linear solenoid SLT and SLU.

Incidentally, the timing of the command in step S21 may also be controlled according to the timing at which the control elements are established.

Also, the engine ECU 13 displays the gear selected in step S20 on the shift range indicator in the combination meter.

Incidentally, in the description above, the routine is executed at predetermined intervals of time by the CPU which is part of the engine ECU 13, but the invention is not limited to this. That is, the routine may also be executed by the CPU that forms part of the transmission ECU 14 or the brake ECU 15. For example, if the routine is executed by the transmission ECU 14, control of the hydraulic control circuit 6 is executed by the transmission ECU 14. Also, if the routine is executed by the brake ECU 15, control of the vehicle brakes is executed by the brake ECU 15.

As described above, in the vehicular control apparatus according to this example embodiment of the invention, when braking force of the engine brake is required while the vehicle 1 is in the high speed state and the automatic transmission 5 is in the manual shift mode, the automatic transmission 5 upshifts into a higher gear, while braking force which is equal to the difference between the engine braking force corresponding to the gear selected according to the running state and the engine braking force corresponding to the gear selected according to a manual operation can be generated by the vehicle brakes. As a result, the vehicle 1 is able to be brought out of the high load state by upshifting the automatic transmission 5 into a higher gear so the engine 2 and the automatic transmission 5 can be protected. In addition, braking force equal to the required braking force of the engine brake can be applied to the vehicle 1 so the driver will not have to perform an unexpected brake operation, which enables the stability of the vehicle 1 during running to be improved.

Also, when the braking force of the engine brake is required while the vehicle 1 is in a high load state, a command to downshift according to a manual operation can be allowed. Accordingly, unnecessary downshifting can be prevented, thereby protecting the engine 2 and the automatic transmission 5.

Also, the engine ECU 13 is able to match the display on the shift range indicator with the operation by the driver by displaying the specified gear of the downshift according to a manual operation on the shift range indicator in the combination meter, not shown. In addition, when a downshift is specified by the driver even when an upshift is to be performed in order to protect the engine 2 and the automatic transmission 5, braking force equal to the braking force of the engine brake that would be generated by that downshift can be applied to the vehicle 1 and the gear specified by the driver is indicated on the shift range indicator in the combination meter. As a result, it is possible to make the driver feel as though a downshift was performed as directed so drivability can be improved.

Also, when braking force from the engine brake is not required while the vehicle 1 is in a high load state, a command to downshift according to a manual operation can be disallowed. Accordingly, when the vehicle 1 is accelerating, at which time the driver will not need to operate the brake even if an upshift is performed, a command to downshift according to a manual operation is disallowed, while the automatic transmission 5 is automatically upshifted into a higher gear to bring the vehicle 1 out of the high load state, thereby protecting the engine 2 and the automatic transmission 5.

Also, when the vehicle 1 is in a high load state, the automatic transmission 5 can be reliably upshifted, thereby bringing the vehicle 1 out of the high load state and protecting the engine 2 and the automatic transmission 5.

Incidentally, the automatic transmission 5 in this example embodiment is simply an example and is not limited to the configuration described above. In addition, the invention may also be applied to a continuously variable transmission such as a CVT.

Also, in the example embodiment described above, the ECU 11 includes the engine ECU 13, the transmission ECU 14, and the brake ECU 15, but the invention is not limited to this. That is, a single ECU may have all of the functions of the engine ECU 13, the transmission ECU 14, and the brake ECU 15. Also, one ECU may have the functions of any two of the engine ECU 13, the transmission ECU 14, and the brake ECU 15, and another ECU may have the function of the remaining ECU.

Also, in the example embodiment described above, a sequential shift is executed in the manual mode using the shift lever 28. However, a steering wheel, not shown, of the vehicle 1 may be provided with an upshift switch for upshifting into a higher gear or range, and a downshift switch for downshifting into a lower gear or range, and a sequential shift may be executed using these shift switches.

For example, the upshift switch may be in the form of an upshift paddle and the downshift switch may be in the form of a downshift paddle. When the driver pulls the upshift paddle or the downshift paddle forward, a shift command may be output. In this case, the ECU 11 detects the shift commands from the upshift paddle and the downshift paddle.

Also, the upshift switch may be in the form of an upshift button and the downshift switch may be in the form of a downshift button. The downshift button may be located on the right spoke of the steering wheel, for example, and the upshift button may be located on the left spoke of the steering wheel, for example, but their locations are not limited to this. Both the upshift button and the downshift button may also be located on one spoke or on both spokes.

Also, in the example embodiment described above, an upshift when the vehicle 1 is operating in a high load state is performed based on the high load state shift line graph. However, an upshift when the vehicle 1 is operating in a high load state may also be forcibly executed irrespective of the shift line graph. In this case, if the engine ECU 13 has determined that the vehicle 1 is in the high load state, the engine ECU 13 may force an upshift to be performed either simultaneously with that determination or after the vehicle 1 has continued to be in the high load state for a predetermined period of time.

Moreover, in the example embodiment described above, the vehicular control apparatus is mounted in an FR vehicle, but the invention is not limited to this. That is, the vehicular control apparatus of the invention may also be applied to an FF (Front engine, Front drive) vehicle or a four-wheel-drive vehicle or the like. In this case, the vehicular control apparatus generates braking force in the front wheels in the case of an FF vehicle, and in both the front and the rear wheels in the case of a four-wheel-drive vehicle.

Also, in the example embodiment described above, the vehicle 1 uses the engine 2 as the power source, but the invention is not limited to this. That is, the vehicle 1 may also be a so-called hybrid vehicle which uses both an engine and a motor-generator as power sources.

As described above, the vehicular control apparatus of the invention is effective for protecting the engine and the automatic transmission and improving vehicle stability during running when the engine and the automatic transmission are in high load states, and is effective as a vehicle control apparatus that controls the gear of an automatic transmission and the braking force of a vehicle.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for a vehicle provided with an automatic transmission which has an automatic shift mode in which a gear is selected according to a running state and a manual shift mode in which a gear is selected according to a manual operation, and which transmits driving force generated by an internal combustion engine, comprising:

a high load state determining unit that determines whether the vehicle is in a high load state;

a braking force required determining unit that determines whether engine braking force from the internal combustion engine is required;

differential braking force calculating unit that calculates differential braking force which is the difference between engine braking force generated when running in a gear selected according to the manual operation and engine braking force generated when running in a gear selected according to the running state;

a brake device that brakes the vehicle; and a controller which controls the automatic transmission to execute an upshift and controls the brake device to generate the differential braking force calculated by the differential braking force calculating unit when i) it is determined by the high load state determining unit that the vehicle is in the high load state and ii) it is determined by the braking force required determining unit that the engine braking force is required, while the automatic transmission is in the manual shift mode.

2. The control apparatus according to claim 1, wherein the controller executes shift control of the automatic transmission according to a gear selected in the automatic shift mode and the manual shift mode, and allows a command to downshift in the manual shift mode when it is determined by the high load state determining unit that the vehicle is in the high load state and it is determined by the braking force required determining unit that engine braking force is required, while the automatic transmission is in the manual shift mode.

3. The control apparatus according to claim 2, wherein the controller disallows a command to downshift in the manual shift mode when it is determined by the braking force required determining unit that the engine braking force is not required.

4. The control apparatus according to claim 2, wherein the controller executes an upshift based on a high load state shift line graph when it is determined by the high load state determining unit that the vehicle is in the high load state.

5. The control apparatus according to claim 2, wherein when it is determined by the high load state determining unit that the vehicle is in the high load state, the controller executes an upshift at the same time that the determination is made.

6. The control apparatus according to claim 2, wherein when it is determined by the high load state determining unit that the vehicle is in the high load state, the controller executes an upshift after the vehicle has continued to be in the high load state for a predetermined period of time.

7. The control apparatus according to claim 1, wherein the controller disallows a command to downshift in the manual shift mode when it is determined by the braking force required determining unit that the engine braking force is not required.

8. The control apparatus according to claim 1, wherein the controller executes an upshift based on a high load state shift line graph when it is determined by the high load state determining unit that the vehicle is in the high load state.

9. The control apparatus according to claim 1, wherein when it is determined by the high load state determining unit that the vehicle is in the high load state, the controller executes an upshift at the same time that the determination is made.

10. The control apparatus according to claim 1, wherein when it is determined by the high load state determining unit that the vehicle is in the high load state, the controller executes an upshift after the vehicle has continued to be in the high load state for a predetermined period of time.

11. A control method for a vehicle provided with an automatic transmission which has an automatic shift mode in which a gear is selected according to a running state and a manual shift mode in which a gear is selected according to a manual operation, and which transmits driving force generated by an internal combustion engine, comprising:

determining whether the vehicle is in a high load state;

determining whether engine braking force from the internal combustion engine is required;

calculating differential braking force which is the difference between engine braking force generated when running in a gear selected according to the manual operation and engine braking force generated when running in a gear selected according to the running state; and controlling the automatic transmission to execute an upshift and performing control to generate the calculated differential braking force when it is determined that i) the vehicle is in the high load state and ii) the engine braking force is required, while the automatic transmission is in the manual shift mode.

12. The control method according to claim 11, further comprising:

allowing a command to downshift in the manual shift mode when it is determined that i) the vehicle is in the high load state and ii) engine braking force is required, while the automatic transmission is in the manual shift mode.

13. The control method according to claim 12, further comprising:

disallowing a command to downshift in the manual shift mode when it is determined that the engine braking force is not required.

14. The control method according to claim 12, further comprising:

executing an upshift based on a high load state shift line graph when it is determined that the vehicle is in the high load state.

15. The control method according to claim 12, further comprising:

executing, when it is determined that the vehicle is in the high load state, an upshift at the same time that the determination is made.

16. The control method according to claim 12, further comprising:

executing, when it is determined that the vehicle is in the high load state, an upshift after the vehicle has continued to be in the high load state for a predetermined period of time.

17. The control method according to claim 11, further comprising:

disallowing a command to downshift in the manual shift mode when it is determined that the engine braking force is not required.

18. The control method according to claim 11, further comprising:

executing an upshift based on a high load state shift line graph when it is determined by the high load state determining unit that the vehicle is in the high load state.

19. The control method according to claim 11, further comprising:

executing, when it is determined that the vehicle is in the high load state, an upshift at the same time that the determination is made.

20. The control method according to claim 11, further comprising:

executing, when it is determined that the vehicle is in the high load state, an upshift after the vehicle has continued to be in the high load state for a predetermined period of time.

* * * * *